United States Patent [19]

Saito et al.

[11] Patent Number: 5,547,772
[45] Date of Patent: Aug. 20, 1996

[54] MAGNETIC RECORDING MEDIUM

[75] Inventors: Shinji Saito; Hiroshi Ogawa; Takeshi Kakuta; Hitoshi Noguchi, all of Odawara, Japan

[73] Assignee: Fuji Photo Film Co., Ltd., Kanagawa, Japan

[21] Appl. No.: 416,331

[22] Filed: Apr. 4, 1995

Related U.S. Application Data

[63] Continuation of Ser. No. 870,303, Apr. 17, 1992, abandoned.

[30] Foreign Application Priority Data

Apr. 19, 1991 [JP] Japan ............................. 3-115588

[51] Int. Cl.$^6$ ............................. G11B 5/66; B32B 3/10; B32B 5/16
[52] U.S. Cl. ............. 428/694 B; 428/141; 428/323; 428/329; 428/336; 428/694 BR; 428/694 BA; 428/694 BM; 428/900
[58] Field of Search ............................ 428/323, 329, 428/336, 694 B, 694 BR, 694 BA, 694 BM, 900, 141

[56] References Cited

U.S. PATENT DOCUMENTS

| | | | |
|---|---|---|---|
| 4,410,590 | 10/1983 | Kawahara et al. | 428/336 |
| 4,439,795 | 3/1984 | Kitamoto et al. | 360/131 |
| 4,784,895 | 11/1988 | Mizuno et al. | 428/212 |
| 4,851,289 | 7/1989 | Ogawa et al. | 428/329 |
| 4,946,374 | 8/1990 | Yamaguchi et al. | 428/323 |
| 4,980,230 | 12/1990 | Saito et al. | 428/329 |
| 5,051,291 | 9/1991 | Kawahara | 428/141 |
| 5,051,303 | 9/1991 | Noguchi et al. | 428/329 |
| 5,084,343 | 1/1992 | Ogawa et al. | 428/329 |
| 5,089,317 | 2/1992 | Noguchi et al. | 428/212 |

FOREIGN PATENT DOCUMENTS

| | | |
|---|---|---|
| 57-69528 | 4/1982 | Japan . |
| 57-98135 | 6/1982 | Japan . |
| 58-17539 | 2/1983 | Japan . |
| 58-53024 | 3/1983 | Japan . |
| 58-56231 | 4/1983 | Japan . |
| 58-70429 | 4/1983 | Japan . |
| 58-56230 | 4/1983 | Japan . |
| 59-172144 | 9/1984 | Japan . |
| 61-214223 | 9/1986 | Japan . |
| 63-187419 | 8/1988 | Japan . |
| 64-19524 | 1/1989 | Japan . |
| 1-106333 | 4/1989 | Japan . |
| 2-192019 | 7/1990 | Japan . |
| 2-254626 | 10/1990 | Japan . |

*Primary Examiner*—Leszek Kiliman
*Attorney, Agent, or Firm*—Sughrue, Mion, Zinn, Macpeak & Seas

[57] ABSTRACT

The present invention is directed to a magnetic recording medium comprising a non-magnetic support having provided thereon a plurality of magnetic layers composed of a lower magnetic layer comprising a ferromagnetic powder and a binder, and an upper magnetic layer comprising a ferromagnetic powder being provided on the lower magnetic layer, wherein the ferromagnetic powder contained in the upper magnetic layer has a length of major axis not longer than 0.30 µm and a crystallite size not larger than 400 Å, the upper magnetic layer has a dry thickness of not more than 1.20 µm, and the surface of the upper magnetic layer has a center-line average surface roughness (Ra) not more than 0.015 µm.

8 Claims, No Drawings

MAGNETIC RECORDING MEDIUM

This is a Continuation of application Ser. No. 07/870,303 filed Apr. 17, 1992 (now abandoned).

FIELD OF THE INVENTION

The present invention relates to a magnetic recording medium comprising a non-magnetic support having thereon a magnetic layer, and more particularly to a magnetic recording medium having a magnetic layer composed of at least two layers and having excellent electromagnetic characteristics.

BACKGROUND OF THE INVENTION

Magnetic recording mediums are widely used in audio tapes, video tapes and floppy disks. It has been attempted in recent years to develop magnetic recording media which enable high density recording to be carried out and which have excellent electromagnetic characteristics capable of providing high image and high sound quality. Various attempts have been made to obtain excellent electromagnetic characteristics. With an increase in the use or application of the magnetic recording media and with an increase in the consumption thereof as media in large quantities, it has been demanded to produce the magnetic recording media at a lower manufacturing cost. Typical methods meeting these requirements include a method wherein loading is increased, a method wherein coercive force is increased, and a method wherein the surface of the medium is made smoother. Further, a multi-layer structure is extensively used to make a more effective recording in the direction of the depth of the magnetic layer. This is because the upper layer has the characteristics for high image quality, and the lower layer has the characteristics for high sound quality. In this approach, a suitable ferromagnetic powder can be used.

The advantage of the multi-layer structure is that the media can be inexpensively produced because a suitable material can be used depending on the respective layer. It is further required that the reproduced output be increased in order to achieve a high image and high sound quality, and that the modulation noise be decreased to improve S/N. This can be attained by improving the loading degree and the smoothness of the magnetic recording medium.

When a multi-layer structure is used, high output can be obtained over a wider frequency range by increasing the coercive force of the upper layer and lowering the coercive force of the lower layer, as described in JP-A-59-172144 (the term "JP-A" as used herein means an "unexamined published Japanese patent application"), JP-A-61-214223, and JP-A-57-69528. The specifications of JP-A-58-56230, JP-A-58-56231, JP-A-58-70429, JP-A-1-106333 and JP-A-58-17539, disclose that noise is reduced by using fine ferromagnetic powder in the upper layer. Further, JP-A-58-53024 discloses that the upper layer is highly filled to obtain high output. Additionally, attempts have been made by paying attention to the size and shape of ferromagnetic powder used in the upper layer, as described in JP-A-57-98135, JP-A-63-187419, JP-A-64-19524, JP-A-2-192019 and JP-A-2-254626. The multi-layer structure is very effective in improving electromagnetic characteristics as mentioned above. However, with the development of high density recording, the degree of the improvement in the electromagnetic characteristics for magnetic recording mediums currently used is still insufficient.

For example, ferromagnetic powder having a finer particle size has been used to reduce noise. In order to reduce noise, the length of the major axis of ferromagnetic powder must not be longer than 0.3 μm. Embodiments using ferromagnetic powder wherein the length of the major axis is not longer than 0.3 μm are disclosed in JP-A-63-187419 and JP-A-64-19524. However, it is difficult to disperse and orient the ferromagnetic powder having such a fine particle size. Hence, it is very difficult to increase the loading degree of the powder. Accordingly, output is lowered and sufficient characteristics cannot be obtained, even though noise can be reduced.

Under such circumstances, the present inventors have eagerly made studies to solve the aforementioned problems found in the art, and have found that when the upper layer in the multi-layer magnetic recording mediums have a specific relationship between the thickness of the upper layer and the shape of retromagnetic powder, electromagnetic characteristics can be greatly improved. The present invention is based on this finding.

SUMMARY OF THE INVENTION

An object of the present invention is to provide a magnetic recording medium, such as an audio tape or a video tape, which exhibits excellent electromagnetic characteristics.

The above-described object of the present invention has been achieved by a magnetic recording medium comprising a non-magnetic support having thereon a plurality of magnetic layers each comprising a ferromagnetic powder and a binder and composed of a lower magnetic layer and an upper magnetic layer provided on said lower magnetic layer, characterized in that the ferromagnetic powder contained in the upper magnetic layer has a length of major axis not longer than 0.30 μm and a crystallite size not larger than 400 Å, the upper magnetic layer has a dry thickness of not more than 1.20 μm and the surface of the upper magnetic layer has a center line average surface roughness (Ra) of not more than 0.015 μm.

DETAILED DESCRIPTION OF THE INVENTION

The present invention is described in more detail below.

Preferred embodiments of the present invention are as follow:

(1) the magnetic recording medium, wherein the length of major axis/crystallite size ratio of the ferromagnetic powder in the upper magnetic layer is 3 to 7, the dry thickness of the upper magnetic layer is not more than 30 times the crystallite size of the ferromagnetic powder in the upper magnetic layer, and the (Ra) of the upper magnetic layer is not more than 1/20 times the length of major axis of the ferromagnetic powder in the upper magnetic layer, and (2) the magnetic recording medium, wherein the upper magnetic layer contains a fine-grained ferromagnetic powder (hereafter "ferromagnetic powder (A)") having the length of major axis of 0.05 to 0.15 μm and the crystallite size of 100 to 300 Å and a coarse-grained ferromagnetic powder (hereafter "ferromagnetic powder (B)") having the length of major axis of 0.10 to 0.20 μm and the crystallite size of 150 to 400 Å in the weight ratio of the former to the latter of 10/90 to 90/10, both the length of major axis and the crystallite size of the ferromagnetic powder (A) are smaller than those of ferromagnetic powder (B), respectively, and the lower magnetic layer contains a ferromagnetic powder having the length of major axis of 0.15 to 0.25 and the crystallite size of 300 to 450 Å, both larger than those of the ferromagnetic powder (B), respectively.

In the present invention, the shape and size of ferromagnetic powder contained in the upper magnetic layer and the center line average surface roughness (Ra) of the upper magnetic layer are basically specified. The result is that loading degree and output can be improved, and noise can be reduced. The stipulation of (Ra) has not been made; however, it must be noted that (Ra) is measured after the preparation of the magnetic recording medium. Hence, the essence of the present invention is closely related to the controlling means of (Ra). Accordingly, in the invention, a means for controlling (Ra) to 15 nm or below may be any means without being particularly limited. In embodiment (1), the ratio of the length of the major axis/the crystallite size, i.e., the acicular ratio, is stipulated from 3 to 7, and the thickness of the upper magnetic layer is stipulated to not more than 1.2 μm; whereby (Ra) can be controlled to not more than 15 nm.

Embodiment (2) has a similar effect to that of embodiment (1). In embodiment (2), two kinds of ferromagnetic powders having different shapes and sizes are contained in the upper magnetic layer and the shapes and sizes thereof are stipulated to specific values. Further, the shape and size of ferromagnetic powder contained in the lower magnetic layer are also stipulated to specific values. In this way, the loading degree of the ferromagnetic powders in the upper magnetic layer is improved, whereby output can be increased. Further, the reduction of noise can be achieved by using finer ferromagnetic powder.

The length of major axis of ferromagnetic powder is an average particle diameter of major axis of 500 particles measured by photographing them with a transmission type electron microscope and analyzing the photograph with an image processing apparatus IBAS-I manufactured by KONTRON CO. The crystallite size of ferromagnetic powder is measured by X-ray diffractometry and determined from the spreading of the half peak width of diffraction peaks of the (4, 4, 0) face and the (2, 2, 0) face in the case of ferromagnetic iron oxide particles, and the (1, 1, 0) face and (2, 2, 0) face in the case of ferromagnetic metal particles. Further, the center-line average surface roughness is an average value of surface roughness (cut off: 0.08 mm) of 20 lines (length 2 mm) on the measured surface using a three-dimensional surface roughness meter (available from, for example, Kosaka Kenkyusho KK)

First, embodiment (1) is illustrated below. For the sake of simplification, the upper magnetic layer is sometimes referred to hereinafter as the "upper layer", and the lower magnetic layer is sometimes referred to hereinafter as the "lower layer".

The present inventors have made studies and found that when ferromagnetic powder has a length of major axis not longer than 0.3 μm, a crystallite size of not larger than 400 Å, and the ratio of the length of the major axis to the crystallite size, that is, the acicular ratio, is not lower than 3, but not higher than 7, a sufficient loading degree can be obtained. It is thought that when the acicular ratio is high, voids are apt to be formed due to the effect of the shape of the powder in the case of loading (filling) ferromagnetic powder in the longer direction of the axis thereof, while when the acicular ratio is low, the effect of the shape is reduced and it is hard to form voids. The use of ferromagnetic powder having a low acicular ratio in the upper layer of the multi-layer structure is conventionally known and disclosed in, for example, the aforesaid JP-A-2-254626. However, sufficient output and S/N cannot be obtained. It is assumed that the reason why the sufficient output and S/N are not obtained is that the loading degree (filling degree) is low and (Ra) is large since the upper layer has a thickness of approximately 1.5 μm.

The present inventors have made studies and found that when a given relation between the crystallite size and the thickness of the upper layer is set, that is, the thickness of the upper layer is not larger than 30 times the crystallite size of ferromagnetic powder contained in the upper magnetic layer, i.e., the thickness of the upper layer is not more than 1.2 μm, there can be obtained a remarkably high output which cannot be expected by conventional magnetic recording mediums.

The reason for the unexpected result so far is not known. The orientation of the ferromagnetic powder in the layer is influenced through a variety of factors. However, it is thought to be due to the fact that when the thickness of the layer is thinner, ferromagnetic powder is apt to be orientated in the longer direction of the axis thereof. This is because the orientation of ferromagnetic powder contained in the upper layer is restricted in the upper surface (because the surface of the magnetic layer is smoothened in the longer direction thereof by calendering) of the upper layer and the lower surface (when the upper layer is a single layer, the lower surface is the support, and when the upper layer is contained in a multi-layer structure, the lower surface is the lower layer) of the upper layer by external factors. Hence, the ferromagnetic powder in the upper layer of said upper and lower surfaces is apt to be arranged in the longer direction, while the ferromagnetic powder in the intermediate part of the layer is apt to be arranged in a relatively random direction. Accordingly, it is believed that when the thickness of the upper layer is thinner, a greater proportion of the ferromagnetic powder is apt to be oriented in the longer direction and the loading degree is improved. However, it is very difficult to estimate the degree. The present inventors have experimentally examined the degree by observing the cross section of a tape and found that the length of the major axis is closely related to the thickness of the upper layer; the high loading of ferromagnetic powder can be effectively achieved when the ratio of the length of the major axis to the crystallite size is not lower than 3, but not higher than 7; and, the thickness of the upper layer is not more than 30 times the crystallite size. Such an example is disclosed in the aforesaid JP-A-2-192019. However, S/N ratio is still insufficient, though the output is high.

The present inventors have made further studies to improve electromagnetic characteristics and found that S/N ratio can be remarkably improved when (Ra) is not more than 1/20 of the length of the major axis, that is, not more than 15 nm. When the surface roughness is high, it is difficult to improve output due to spacing loss even though an increase in output and a reduction in noise are achieved by improving the loading degree with ferromagnetic powder having a smaller axis length. Further, modulated noise due to roughness is added and an effect of reducing noise cannot be sufficiently obtained. When a reduction in noise by using finer ferromagnetic powder, as well as a reduction in noise by smoothing the surface of the ferromagnetic powder, is achieved, S/N ratio is for the first time improved by using finer ferromagnetic powder, and the effect of improving the S/N ratio is particularly remarkable with the value of the relative relationship between the length of the major axis of ferromagnetic powder and the surface roughness thereof defined above.

The length of the major axis of ferromagnetic powder used in embodiment (1) is not longer than 0.3 μm, preferably not longer than 0.2 μm. It is preferred that the length of the major axis of ferromagnetic powder to be contained in the upper layer is shorter than that of the major axis of ferromagnetic powder to be contained in the lower layer. The ratio of the length of the major axis of ferromagnetic powder to the crystallite size thereof used in the upper layer of embodiment (1) is not less than 3, but not more than 7, preferably not less than 4, but not higher than 6. When the ratio of the length of the major axis is less than 3, orientation is deteriorated. Ferromagnetic powder generally has a specific surface area of 25 to 80 m$^2$/g, preferably 35 to 60 m$^2$/g as measured by BET method. When the specific surface area is smaller than 25 m$^2$/g, noise tends to be increased, while when the specific surface area is larger than 80 m$^2$/g, good surface profile can be obtained with some difficulty. It is desirable that the specific surface area of ferromagnetic powder to be contained in the upper layer is larger than that of ferromagnetic powder to be contained in the lower layer. Ferromagnetic powder contained in the upper layer of the present invention has a crystallite size of not more than 400 Å, preferably 150 to 350 Å. It is preferred that the crystallite size of ferromagnetic powder contained in the upper layer is smaller than that of ferromagnetic powder contained in the lower layer. Ferromagnetic powder used in the present invention generally has a coercive force (Hc) of 200 to 2000 Oe, preferably 350 to 1600 Oe. It is preferred that ferromagnetic powder contained in the upper layer has a higher Hc value than that of ferromagnetic powder contained in the lower layer.

Secondly, embodiment (2) is illustrated below.

Generally, noise can be reduced by using finer-grained ferromagnetic powder. However, dispersibility is poor and the squareness ratio is difficultly increased. On the contrary, coarser-grained ferromagnetic powder is excellent in dispersibility and squareness ratio is high, but noise is increased. Hence, coarser-grained ferromagnetic powder is not preferred. Further, when the particle size is large, voids between particles are increased and the loading degree is lowered.

For these reasons, the upper layer contains fine-grained ferromagnetic powder (A) having a length of major axis of 0.05 to 0.15 μm and a crystallite size of 100 to 300 Å and coarse-grained ferromagnetic powder having a length of major axis of 0.1 to 0.2 μm and a crystallite size of 150 to 400 Å in the ratio (A)/(B) of 10/90 to 90/10 by weight; wherein both the length of the major axis and the crystallite size of ferromagnetic powder (B) is said upper layer are larger than those of ferromagnetic powder (A); and the lower layer contains ferromagnetic powder having a length of major axis of 0.15 to 0.25 μm and a crystallite size of 300 to 450 Å, wherein both the length of the major axis and the crystallite size of ferromagnetic powder contained in the lower layer are larger than those of the coarse-grained ferromagnetic powder, contained in the upper magnetic layer.

A combination of ferromagnetic powder (A) having a length of major axis of 0.08 to 0.15 μm and a crystallite size of 150 to 290 Å and ferromagnetic powder (B) having a length of major axis of 0.15 to 0.20 μm and a crystallite size of 290 to 400 Å is preferred. A preferred ratio of the two kinds of the ferromagnetic powders is in the range of ferromagnetic powder (A)/ferromagnetic powder (B) of 70/30 to 90/10 by weight.

Dispersibility and squareness ratio can be improved and voids can be reduced when two kinds of ferromagnetic powders having different particle sizes are mixed as described above. In this way, an improvement in output (by upping the loading degree) as well as a reduction in noise (by using finer-grained ferromagnetic powder) can be achieved.

When ferromagnetic powder (A) has a length of major axis of less than 0.05 μm and a crystallite size of less than 100 Å, the ferromagnetic powder cannot be sufficiently dispersed, and the loading degree and squareness ratio are lowered when ferromagnetic powder (A) has a length of major axis of more than 0.15 μm and a crystallite size of more than 300 Å, the particle size of ferromagnetic powder is too large and noise is increased. When ferromagnetic powder (B) has a length of major axis less than 0.10 μm and a crystallite size of less than 150 Å, both the two kinds of the ferromagnetic powders are fine powders. Consequently, dispersibility is lowered and the effect of the present invention cannot be obtained. Further, when the mixing ratio of the two kinds of the ferromagnetic powders is outside the range defined above, the effect of the present invention cannot be obtained.

Ferromagnetic powder contained in the lower layer has a length of 0.15 to 0.25 μm and a crystallite size of 300 to 450 Å wherein both the length of the major axis and the crystallite size of ferromagnetic powder contained in the lower layer are larger than those of ferromagnetic powder (B) contained in the upper layer. More preferably, ferromagnetic powder contained in the lower layer has a length of major axis of 0.15 to 0.2 μm and a crystallite size of 300 to 400 Å. This stipulation is an important factor from the viewpoint of improving the surface profile of the upper magnetic layer. When the length of the major axis is less than 0.15 μm and the crystallite size is less than 300 Å, the particle size of ferromagnetic powder is too fine. Consequently, the ferromagnetic powder cannot be sufficiently dispersed and the squareness ratio of the lower layer is decreased. Further, the surface profile of the lower layer is lowered. As a result, the surface profile of the upper layer is also lowered.

In addition, when the length of the major axis is larger than 0.25 μm and the crystallite size is larger than 450 Å, the particle size is too large. Hence, the noise of the long wavelength component recorded on the lower layer is increased. Moreover, the surface profile of the lower layer and the upper surface in turn are lowered.

General matters with regard to the present invention (including embodiments (1) and (2)) are illustrated below.

The ferromagnetic powder content of the upper layer is preferably not lower than 70%. When the ferromagnetic powder content is lower than 70%, the loading degree of the ferromagnetic powder is lowered and the electromagnetic characteristics may be diminished. The term "ferromagnetic powder content", as used herein, refers to the wt % of ferromagnetic powder/ferromagnetic powder+binder+other materials such as additives to be contained in the magnetic layer.

The magnetic recording mediums of the present invention have such magnetic characteristics that the squareness ratio of each layer is at least 0.7, preferably at least 0.8, more preferably at least 0.9, as measured at a magnetic field of 5 kOe.

The saturation magnetization us of ferromagnetic powder used in the present invention is at least 50 emu/g, preferably at least 70 emu/g. When the ferromagnetic substance is fine metallic powder, at least 100 emu/g is preferred. The water content of ferromagnetic powder is reduced to preferably 0.01 to 2%. It is preferred, that the water content of ferromagnetic powder is adjusted to the optimum value depending on the types of binders.

When cobalt-modified iron oxide is used as the ferromagnetic powder of the present invention, the ratio of iron(II) to iron(III) is preferably from 0 to 33.3% by weight, more preferably from 5 to 10% by weight. The ratio of cobalt atom to iron atom is from 0 to 15% by weight, preferably from 3 to 8% by weight.

It is preferred that the pH of the ferromagnetic powder is optimized depending on the type of the binder to be used in combination therewith. In general, the pH is in the range of 4 to 12.

If desired, the surface of the ferromagnetic powder may be treated with Al, Si, P or oxides thereof. The amount of the surface treating agent is 0.1 to 10% based on the amount of the ferromagnetic powder.

In some cases, there is a possibility that the ferromagnetic powders used in the both the upper layer and the lower layer contain soluble inorganic ions such as Na, Ca, Fe, Ni and Sr ions. However, there is no particular effect thereby, so long as the amount thereof is not more than 500 ppm.

Examples of the ferromagnetic powder which can be used in he present invention include conventional ferromagnetic powders, such as $\gamma$-FeOx (x=1.33~1.5), Comodified FeOx (x=1.33~1.5) and Fe, Ni or Co (at least 75% by weight) based ferromagnetic alloy fine powders. In addition to these required atoms, these ferromagnetic powders may contain other elements such as Al, Si, S, SC, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B.

These ferromagnetic fine powders may be treated with dispersants, lubricants, surfactants and antistatic agents, described hereinafter, before dispersion.

Among the above-described ferromagnetic powders, the ferromagnetic alloy fine powders may contain a small amount of hydroxides or oxides. The fine powders of ferromagnetic alloys prepared by conventional methods can be used in the present invention. Examples of the methods for preparing the fine powders of the ferromagnetic alloys which can be used in the present invention, include a method wherein a composite organic acid salt (mainly an oxalate) is reduced with a reducing gas such as hydrogen; a method wherein iron oxide is reduced with a reducing gas such as hydrogen to obtain Fe or Fe-Co particles; a method wherein a metal carbonyl compound is thermally decomposed; a method wherein a reducing agent such as sodium boron hydride, a hypophosphite or hydrazine is added to an aqueous solution of ferromagnetic metal to reduce it; and, a method wherein a metal is vaporized in an inert gas under low pressure conditions to obtain a fine powder. The thus-obtained ferromagnetic alloy powders may be subjected to conventional slow oxidation treatments. Examples of such treatments include a method wherein the alloy powder is immersed in an organic solvent and then dried; a method wherein the alloy powder is immersed in an organic solvent where an oxygen-containing gas is then introduced to form an oxidized film on the surface of the powder, and the powder is dried; and, a method wherein the partial pressures of an oxygen-containing gas and inert gas are controlled to form an oxidized film on the surface of the alloy powder without using any organic solvent.

It is preferred that ferromagnetic powder used in the present invention has less voids. The void content thereof is preferably not higher than 20% by volume, more preferably not higher than 5% by volume. The ferromagnetic powders used in the present invention can be prepared by conventional methods.

Binders which can be used in the present invention include conventional thermoplastic resins, thermosetting resins, reactive resins and mixtures thereof.

The thermoplastic resins which may be used in the present invention include those having a glass transition temperature of from -100° to 150° C., a number-average molecular weight of 1,000 to 200,000, preferably 10,000 to 100,000, and a degree of polymerization of about 50 to 1,000.

Examples of such thermoplastic resins include polymers and copolymers comprising, as constituent units, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal and vinyl ether units, polyurethane resins and various rubber resins.

Examples of thermosetting resins or the reactive resins which may be used include phenolic resins, epoxy resins, curable polyurethane resins, urea resins, melamine resins, alkyd resins, reactive acrylic resins, formaldehyde resins, silicone resins, epoxy-polyamide resins, mixtures of polyester resins and isocyanate prepolymers, mixtures of polyester polyols and polyisocyanates, and mixtures of polyurethanes, and polyisocyanates.

The details of these resins are described in *Plastic Handbook*, published by Asakura Shoten.

Conventional electron beam-curable resins can be used. Examples of such resins and methods for preparing the resins are described in JP-A-62-256219.

The above-described resins may be used either alone or in combination. Examples of the combination include combinations of at least one member selected from the group consisting of vinyl chloride resin, a vinyl chloride-vinyl acetate resin, a vinyl chloridevinyl acetate-vinyl alcohol resin, and a vinyl chloridevinyl acetate-maleic anhydride copolymer with a polyurethane resin or with a polyurethane resin and a polyisocyanate.

Examples of the polyurethane which can be used in the present invention include conventional resins such as polyester polyurethane, polyether polyurethane, polyether polyester polyurethane, polycarbonate polyurethane, polyester polycarbonate-polyurethane and polycaprolactone polyurethane.

It is preferred that at least one polar group selected from the group consisting of COOM, $SO_3M$, $OSO_3M$, $P=O(OM)_2$, $O-P=O(OM)_2$ (wherein M is hydrogen atom or an alkali metal), OH, $NR_2$, $N^+R_3$ (wherein R is a hydrocarbon group), an epoxy group, SH and CN is optionally introduced into these binders by a copolymerization reaction or an addition reaction to impart excellent dispersibility and durability. The amount of the polar group is $10^{-1}$ to $10^{-8}$ mol/g, preferably $10^{-2}$ to $10^{-6}$ mol/g.

Concrete examples of the binders which can be used in the present invention include VAGH, VYHH, VMCH, VACF, VAGF, VAGD, VROH, VYES, VYNC, VMCC, XYHL, XYSG, PKHH, PKHJ, PKHC and PKFE (products of Union Carbide Corporation); MPR-TA, MPR-TA5, MPR-TAL, MPR-TSN, MPR-TMF, MPR-TS and MPR-TM (products of Nissin Kagaku Kogyo KK); 1000W, DX80, DX81, DX82 and DX83 (products of Denki Kagaku KK); MR110, MR100 and 400X110A (products of Nippon Zeon Co., Ltd.); Nippollan N2301, N2302 and N2304 (Nippon Polyurethane KK); Pandex T-5105, T-R3080 and T-5201, Burhock D-400 and D-210, Crisvon 6109 and 7209 (products of Dainippon Ink & Chemicals Inc.); Vylon UR8200, UR8300, RV530 and RV280 (products of Toyoho Co., Ltd.); Daipheramine 4020, 5020, 5100, 5300, 9020, 9022 and 7020 (products of Dainichiseika Colors & Chemicals Mfg. Co., Ltd.); MX5004 (a product of Mitsubishi Kasei Corporation); Sunprene SP-150 (a product of Sanyo Chemical Industries, Ltd.); and Salan F310 and F210 (products of Asahi Kasei Kogyo K.K.).

In each of the upper and lower layers, the binder is generally used in an amount of 5 to 50% by weight, preferably 10 to 30% by weight based on the amount of the ferromagnetic powder used in each of the upper layer and the lower layer. It is preferred that a vinyl chloride resin is used in an amount of 5 to 30% by weight, a polyurethane resin is used in an amount of 2 to 20% by weight and a polyisocyanate is used in an amount of 2 to 20% by weight.

Polyurethane resins having a glass transition temperature of from −50° to 100° C., an elongation at break of 100 to 2,000%, a breaking stress of 0.05 to 10 $kg/cm^2$ and a yield point of 0.05 to 10 $kg/cm^2$, are preferred in the present invention.

Examples of the polycyanate which can be used in the present invention include isocyanates such as tolylene diisocyanate, 4,4'-diphenylmethane diisocyanate, haxamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyols; and polyisocyanate formed by the condensation of these isocyanates. Many polyisocyanates are commercially available. Examples of such polyisocyanates include Coronate L, Coronate HL, Coronate 2030, Coronate 2031, Millionate MR, Millionate MTL (manufactured by Nippon Polyurethane Industry Co., Ltd.); Takenate D-102, Takenate D-110N, Takenate D-200 and Takenate D-202 (manufactured by Takeda Chemical Industries, Ltd.); and Desmodule L, Desmodule IL, Desmodule N and Desmodule HL (manufactured by Sumitomo Bayer Co., Ltd.). These polyisocyanate can be used either alone or in combination of two or more of them by utilizing a difference in curing reactivity. They can be used for the upper layer as well as the lower layer.

Examples of carbon black which can be used for the magnetic layers of the present invention include furnace black for rubber, thermal black for rubber, carbon black for coloring and acetylene black. It is preferred that carbon black having a specific surface area of 5 to 500 $m^2/g$, DBP oil absorption of 10 to 400 ml/100 g, a particle size of 5 to 300 mμ, a pH of 2 to 10, a water content of 0.1 to 10% and a tap density of 0.1 to 1 g/cc is used in the present invention.

Concrete examples of carbon black which can be used in the present invention include BLACK PEARLS 2000, 1300, 1000, 900, 800 and 700, VULCAN XC-72 (manufactured by Cabot); #80, #60, #55, #50 and #35 (manufactured by Asahi Carbon KK); #2400B, #2300, #900, #1000, #30, #40 and #10B (manufactured by Mitsubishi Kasei Corporation); CONDUC TEX SC, RAVEN 150, 50, 40 and 15 (manufactured by Colombia Carbon). The surface of carbon black may be treated with a dispersant. A resin may be grafted onto carbon black. A part of the surface of carbon black may contain graphite. Carbon black may be dispersed in the binder before carbon black is added to a magnetic coating material. These carbon blacks may be used either alone or in combination. Carbon black is generally used in an amount of 0.1 to 30% based on the amount of ferromagnetic powder.

Carbon blacks are capable of imparting antistatic properties to the magnetic layers, reducing a coefficient of friction, imparting light screening properties and improving the strength of the layers. These functions vary depending on the types of carbon blacks. Accordingly, the carbon blacks to be used for the upper and lower layers are chosen on the basis of the type, amount and combination thereof; and properties such as particle size, oil absorption, electrical conductivity, pH and the like according to purpose. Carbon blacks which can be used for the magnetic layers of the present invention are referred to, for example, in *Carbon Black Binran*, edited by Carbon Black Association.

Abrasives which can be used in the present invention include conventional materials having a Mohs hardness of at least 6. Examples of such materials include α-alumina having an α component content of at least 90%, β-alumina, silicon carbide, chromium oxide, cerium oxide, α-iron oxide, corundum, artificial diamond, silicon nitride, silicon carbide, titanium carbide, titanium oxide, silicon dioxide and boron nitride. These abrasives may be used either alone or in combination. Composite abrasives (obtained by treating the surface of an abrasive with another abrasive) may be used. These abrasives sometimes contain other compounds or elements than the principal component. However, they have an effect substantially equal to that of pure material, so long as they contain at least 90% of the principal component. These abrasives have a particle size of preferably 0.01 to 2μ. If desired, a similar effect may be obtained by optionally combining two or more abrasives having different particle sizes or widening the particle size distribution of a single abrasive. It is preferred that the abrasives have a tap density of 0.3 to 2 g/cc, a water content of 0.1 to 5%, a pH of 2 to 11 and a specific surface area of 1 to 30 $m^2/g$. The abrasives of the present invention may be in any form such as a needle, a sphere or a die. However, a shape having a horn thereon is preferred from the viewpoint of high abrasive action.

Concrete examples of the abrasives which can be used in the present invention include AKP-20, AKP-30, AKP-50 and HIT-50 (manufactured by Sumitomo Chemical Co., Ltd.); G5, G7 and S-1 (manufactured by Nippon Chemical Industrial Co., Ltd.); and 100ED and 140ED (manufactured by Toda Kogyo KK). These abrasives may be dispersed in the binder and then added to the magnetic coating material.

Additives having a lubricating effect, an antistatic effect, a dispersing effect and a plasticizing effect are generally used in the present invention. Examples of such additives include molybdenum disulfide, tungsten disulfide, graphite, boron nitride, fluorinated graphite, silicone oil, silicones having a polar group, fatty acid modified silicones, fluorinated silicones, fluorinated alcohols, fluorinated esters, polyolefins, polyglycols, alkylphosphoric esters and alkali metal salts thereof, alkylsulfuric esters and alkali metal salts thereof, polyphenyl ethers, fluorinated alkyl sulfuric esters and alkali metal salts thereof, monobasic fatty acids having 10 to 24 carbon atoms (which may contain unsaturated bonds and may be branched) and metal salts (e.g., Li, Na, K and Cu salts) thereof, mono-, di-, tri-, tetra-, penta- and hexahydric alcohols having 12 to 22 carbon atoms (which may contain unsaturated bonds and may be branched), alkoxyalcohols having 12 to 22 carbon atoms, mono-, di- or trifatty acid esters of monobasic fatty acids having 10 to 24 carbon atoms (which may contain unsaturated bonds and may be branched) with any one of mono-, di-, tri-, tetra-, penta- and hexahydric alcohols having 2 to 12 carbon atoms (which may contain unsaturated bonds and may be branched), fatty acid esters of monoalkyl ethers of alkylene oxide polymers, fatty acid amides having 8 to 22 carbon atoms, and aliphatic amines having 8 to 22 carbon atoms. Concrete examples of such compounds include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

Further, nonionic surfactants may be used such as alkylene oxide, glycerin, glycidol and alkylphenol ethylene oxide adducts; cationic surfactants such as cyclic amines, ester amides, quaternary ammonium salts, hydantoin derivatives, heterocyclic compounds, phosphonium compounds and sulfonium compounds; anionic surfactants having an acid group such as carboxyl group, sulfo group, phosphate group, sulfuric ester group or phosphoric ester group; and ampholytic surfactants such as amino acids, aminosulfonic acids, sulfuric or phosphoric esters of aminoalcohols and alkylbetaines. The details on the use of these surfactants are described in *Surfactant Handbook* (published by Sangyo Tosho KK).

These lubricants, antistatic agents, etc. may not always be 100% pure material, but may contain impurities such as isomers, unreacted materials, by-products, decomposition products and oxidation products other than principal ingredients. However, the amounts of the impurities should be preferably not more than 30%, more preferably not more than 10%.

The types and amounts of these lubricants, surfactants, etc., which are used in the present invention, can be properly chosen for each layer according to purpose.

The additive(s) (used in the present invention), or some part thereof, may be added at any stage during the course of the preparation of the magnetic coating material. For example, the additives may be mixed with ferromagnetic powder before a kneading stage, or may be added during the kneading stage in which ferromagnetic powder is kneaded with the binder and solvent. If desired, the additives may be added during or after a dispersion stage, or may be added immediately before coating.

Organic solvents may be used at an arbitrary ratio in the present invention. Examples of the organic solvents which can be used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; and N,N-dimethylformamide and hexane.

With regard to the thickness of the magnetic recording medium of the present invention, the non-magnetic support generally has a thickness of 1 to 100μ, preferably 6 to 20 μm, the lower magnetic layer generally has a thickness of 0.5 to 10 μm, and the upper magnetic layer in embodiment (1) has a thickness of preferably not more than 20 times the crystallite size of ferromagnetic powder in said upper magnetic layer and a thickness of preferably not more than 20 times the crystallite size of the coarsed-grained ferromagnetic powder in embodiment (2). The thickness of the magnetic layer is generally in the range of 1/100 to twice the thickness of the non-magnetic support.

An undercoat layer may be provided between the non-magnetic flexible support and an interlayer to improve adhesion. An interlayer such as a layer containing carbon black, may be provided to impart antistatic properties. The thickness of each of these layers is 0.01 to 2μ, preferably 0.05 to 0.5μ. Further, a back coat layer may be provided on the opposite side of the support to the magnetic layer. The thickness of the back coat layer is 0.1 to 2μ, preferably 0.3 to 1.0μ. Conventional layers can be used as these interlayers and back coat layer.

Examples of the non-magnetic support which can be used in the present invention include conventional films such as films of polyesters (e.g., polyethylene terephthalate, polyethylene naphthalate), polyolefins, cellulose triacetate, polycarbonates, polyamides, polyimides, polyamide-imides, polysulfone, aramides and aromatic polyamides. These supports may have previously been subjected to a corona discharge treatment, a plasma treatment, an easy adhesion treatment, a heat treatment and a dust removing treatment. The non-magnetic support having a center-line average surface roughness (Ra) of preferably not more than 0.02μ, more preferably not more than 0.01μ, is used to achieve the object of the present invention. Further, it is preferred that these non-magnetic supports not only have merely a small center-line average surface roughness, but do not have any coarse protrusion of 1μ or larger. The surface roughness can be freely controlled by the size and amount of filler which is optionally added to the support. Examples of the filler include oxides and carbonates of Ca, Si and Ti, and fine organic powders such as acrylic resin powders.

The process for the preparation of the magnetic coating composition for use in the preparation of the magnetic recording medium of the present invention comprises a kneading stage, a dispersion stage and a mixing stage which is optionally provided before or after the kneading and dispersion stages. Each stage may be composed of two or more steps. All starting materials such as ferromagnetic powder, binder, carbon black, abrasive, antistatic agent, lubricant, solvents, etc., may be added first or on the way of the preparation at any stage. Each starting material may be divided and added in two or more stages. For example, polyurethane may be divided and added to the kneading stage, the dispersion stage and the mixing stage for adjusting viscosity after dispersion.

Conventional techniques for the preparation of the magnetic coating composition can be used as a part of these stages. For example, a kneader having powerful kneading action, such as a continuous kneader or a pressure kneader, can be used in the kneading stage. When the continuous kneader or the pressure kneader is used, some (preferably at least 30% of the total amount of the binder) or all of the ferromagnetic powder and the binder are kneaded in an amount of 15 to 500 parts of the binder per 100 parts of ferromagnetic powder. The details of the kneading treatment are described in Japanese Patent Application Nos. 62-264722 and 62-236872. The magnetic recording medium of the present invention can be efficiently prepared by a co-coating system (a multi-layer being simultaneously coated) as described in JP-A-62-212933.

Generally, powerful orientation is carried out in order to obtain the magnetic recording medium of the present invention. It is preferred that a solenoid of at least 1000 G and a cobalt magnet of at least 2000 G are used in combination. Further, it is preferred that a drying stage (where proper drying is conducted) is provided before orientation to provide the highest orientation after drying.

In the present invention, heat-resistant plastic rolls such as rolls made of epoxy resins, polyimides, polyamides, and polyamide-imides are used as calendering rolls. The magnetic recording medium of the present invention may be treated with metallic rolls. The treating temperature is preferably not lower than 70° C., more preferably not lower than 80° C. Linear pressure is preferably not lower than 200 kg/cm, more preferably not lower than 300 kg/cm.

The surface of the magnetic layer of the magnetic recording medium of the present invention and the surface of the opposite side to the magnetic layer have a coefficient of friction against a pole of SUS 420J of preferably not higher than 0.5, more preferably not higher than 0.3; and, a surface resistivity of preferably $10^{-5}$ to $10^{-12}$ ohm/sq. The magnetic layer generally has a modulus at an elongation of 0.5% of preferably 100 to 200 kg/mm² both in the traveling direction and in the width direction, and a breaking strength of preferably 1 to 30 kg/cm². The magnetic recording medium has a modulus of preferably 100 to 1500 kg/mm² both in the traveling direction and in the width direction, a residual elongation of preferably not more than 0.5% and a heat shrinkage factor of preferably not more than 1%, more preferably not more than 0.5%, most preferably not more than 0.1%, over a temperature range of not higher than 100° C.

The amount of the residual solvent contained in the magnetic layer is preferably not more than 100 mg/m², more preferably not more than 10 mg/m². It is preferred that the amount of the residual solvent contained in the upper layer is less than that of the residual solvent contained in the lower layer.

The void volume of each of the lower and upper magnetic layers is preferably not more than 30% by volume, more preferably not more than 10% by volume. It is preferred that the void volume of the lower layer is larger than that of the upper layer. However, the void volume of the lower layer may be less than that of the upper layer, so long as the void volume of the lower layer is not less than 5%. Generally the magnetic recording medium of the present invention has magnetic characteristics such that the squareness ratio is at least 0.70, preferably at least 0.80, more preferably at least 0.90 in the traveling direction of the tape as measured in a magnetic field of 5 kOe. The squareness ratio in two directions perpendicular to the traveling direction of the tape is preferably not higher than 80% of the squareness ratio in the traveling direction. The magnetic layer has a SFD of preferably not more than 0.6.

The present invention is now illustrated in greater detail by reference to the following examples which, however, are not to be construed as limiting the present invention in any way. Additionally all "parts" are by weight.

EXAMPLE 1

| Lower magnetic layer | |
| --- | --- |
| Cobalt-modified iron oxide<br>Hc: 700 Oe, specific surface area: 60 m²/g<br>crystallite size: 400Å<br>particle size (length of major axis): 0.30 μ<br>acicular ratio: 7.5 | 100 parts |
| Vinyl chloride-vinyl acetate-maleic<br>anhydride copolymer<br>(composition ratio = 86:13:1, a degree of<br>polymerization: 400) | 10 parts |
| Polyester polyurethane resin | 5 parts |
| Carbon black (particle size: 0.05 μm) | 3 parts |
| Butyl stearate | 1 part |
| Stearic acid | 2 parts |
| Butyl acetate | 200 parts |
| Upper magnetic layer | |
| Cobalt-modified iron oxide<br>Hc: 900 Oe, specific surface area: 50 m²/g<br>crystallite size: 300Å<br>particle size (length of major axis): 0.18 μ<br>acicular ratio: 6 | 100 parts |
| Vinyl chloride copolymer having sodium | 12 parts |
| sulfonate group<br>Sodium sulfonate group content: $5 \times 10^{-5}$ mol/g<br>a degree of polymerization: 300 | |
| Polyester polyurethane resin<br>carboxyl group content: $10^{-4}$ mol/g | 6 parts |
| α-Alumina (particle size: 0.3 μm) | 3 parts |
| Carbon black (particle size: 0.10 μm) | 3 parts |
| Butyl stearate | 1 part |
| Stearic acid | 2 parts |
| Butyl acetate | 200 parts |

The above-described ingredients for each of the above-described two coating compositions were kneaded in a kneader and dispersed in a sand mill. Subsequently, 5 parts of a polyisocyanate were added to the resulting dispersion for the coating solution of the lower magnetic layer, and 6 parts of the polyisocyanate were added to the dispersion for the coating solution of the upper magnetic layer. Further, 40 parts of butyl acetate were added to each of the above solutions, and each of the resulting solutions were filtered through a filter having an average pore size of 1 μm to prepare a coating solution for forming the lower magnetic layer and a coating solution for forming the upper magnetic layer.

The thus-prepared coating solution for forming the lower magnetic layer was coated on a 15 μm-thick polyethylene terephthalate support having a center line surface roughness of 0.01μ in such an amount as to give a dry thickness of 3.0 μm, and immediately thereafter, the coating solution for forming the upper magnetic layer was coated thereon in such an amount as to give a thickness of 0.5 μm. The coating was conducted by means of a co-coating system. While both layers were still wet, the coated product was oriented by using a cobalt magnet having a magnetic force of 3000 G and a solenoid having a magnetic force of 1500 G, dried and then treated at 90° C. by means of 7-stage calender composed of only metallic rolls. The resulting product was slitted into tapes of ½ inch in width, thus obtaining a video tape. The thus-obtained tape is referred to as A2. The characteristics thereof are shown in Table 1.

EXAMPLE 1-2

The procedure of Example 1 was repeated except that ferromagnetic powder contained in the upper magnetic layer had a length of major axis of 0.21 μm, 0.12 μm and 0.09μ to obtain each of samples A1, A3 and A4, respectively.

EXAMPLE 1-3

The procedure of Example 1 was repeated except that ferromagnetic powder contained in the upper magnetic layer had a crystallite size of 400 Å and a length of major axis of 0.28 μm and 0.18 μm to obtain each of samples A5 and A6, respectively.

EXAMPLE 1-4

The procedure of Example 1 was repeated except that the upper magnetic layer had a thickness of 0.7 μm and 0.2 μm to obtain each of samples A7 and A8, respectively.

EXAMPLE 1-5

The procedure of Example 1 was repeated except that the support had a center-line average surface roughness of 0.005 μm to obtain sample A9.

EXAMPLE 1-6

The procedure of Example 1 was repeated except that ferromagnetic metallic powder having a length of major axis of 0.14 μm, a crystallite size of 200 Å, a specific surface area of 55 m$^2$/g and a Hc of 1600 Oe was used as the ferromagnetic powder contained in the upper magnetic layer to obtain sample A10.

EXAMPLE 1-7

The procedure of Example 1 was repeated except that ferromagnetic metallic powder having a length of major axis of 0.10 μm, a crystallite size of 200 Å, a specific surface area of 55 m$^2$/g and a Hc of 1600 Oe was used as the ferromagnetic powder contained in the upper magnetic layer to obtain sample A11.

EXAMPLE 1-8

The procedure of Example 1 was repeated except that ferromagnetic powder contained in the upper magnetic layer had a length of major axis of 0.30 μm to obtain sample A12.

Comparative Example 1

The procedure of Example 1 was repeated except that ferromagnetic powder contained in the upper magnetic layer had a length of major axis of 0.36 μm and a crystallite size of 450 Å to obtain sample B1.

Comparative Example 2

The procedure of Example 1 was repeated except that ferromagnetic powder contained in the upper magnetic layer had a length of major axis of 0.30 μm and a crystallite size of 400 Å and the upper magnetic layer had a thickness of 1.5 μm to obtain sample B2.

Comparative Example 3

The procedure of Example 1 was repeated except that the upper magnetic layer had a thickness of 1.0 μm to obtain sample B3.

EXAMPLE 1-9

The procedure of Example 1-5 was repeated except that the support had a center line average surface roughness of 0.02 μm and 0.015 μm to obtain each of samples A13 and A14, respectively.

The thus-obtained samples were evaluated in the following manner.

RF output

Video signals of image signals 50IRE were recorded by reference image transcription current. The mean value of the envelope of the reproduced RF output was measured by means of an oscilloscope. The RF output was calculated from the following formula:

$$RF \text{ output } (dB) = 20 \log_{10} (V/V_0)$$

($V$=mean value, $V_0$=reference value)

S/N

A noise meter (925R) manufactured by Shibasoku Co., Ltd. was used, and a difference in S/N was determined by using the tape of Example 1-8 (A-12) as the standard tape. VTR used was NV-8300 manufactured by Matsushita Electric Industrial Co., Ltd.

Hc

A vibrating specimen type flux meter manufactured by Toei Kogyo KK was used, and Hc was measured at Hm 2 kOeo Center-line average surface roughness A three-dimensional surface roughness meter (SE-3AK, manufactured by Kosaka Kenkyusho KK) was used, and the center line average surface roughness (Ra) was measured under a condition of a cut off value of 0.08 mm.

Length of major axis of ferromagnetic powder

The average particle diameter of major axes was determined by a transmission type electron microscope.

Crystallite size of ferromagnetic powder

The crystallite size was determined from the spreading of the half width of the diffraction pattern of the (4,4,0) face and the (2,2,0) face by X-ray diffraction.

TABLE 1

| Sample No. | Upper magnetic layer | | | | | Evaluation of characteristics | | |
|---|---|---|---|---|---|---|---|---|
| | Ferromagnetic Powder | | | | | | | |
| | length of major axis (μm) | crystallite size (Å) | acicular ratio | Hc (Oe) | thickness (μm) | Ra (nm) | RF output (dB) | S/N |
| A12 | 0.30 | 300 | 10 | 900 | 0.5 | 6 | 0.0 | 0.0 |
| A1 | 0.21 | 300 | 7 | 900 | 0.5 | 6 | 0.3 | 0.6 |
| A2 | 0.18 | 300 | 6 | 900 | 0.5 | 6 | 0.6 | 1.0 |
| A3 | 0.12 | 300 | 4 | 900 | 0.5 | 6 | 0.6 | 1.5 |
| A4 | 0.09 | 300 | 3 | 900 | 0.5 | 6 | 0.6 | 1.8 |
| A5 | 0.28 | 400 | 7 | 900 | 0.5 | 6 | 0.5 | 0.2 |
| A6 | 0.18 | 400 | 4.5 | 900 | 0.5 | 6 | 0.8 | 0.9 |
| B1 | 0.36 | 450 | 8 | 900 | 0.5 | 6 | −0.5 | −0.1 |
| B2 | 0.30 | 400 | 7.5 | 900 | 1.5 | 6 | −1.0 | −0.5 |
| B3 | 0.18 | 300 | 6 | 900 | 1.0 | 6 | 0.0 | 0.3 |
| A7 | 0.18 | 300 | 6 | 900 | 0.7 | 6 | 0.3 | 0.5 |
| A8 | 0.18 | 300 | 6 | 900 | 0.2 | 6 | 1.0 | 1.0 |
| A13 | 0.18 | 300 | 6 | 900 | 0.5 | 12 | 0.3 | −0.4 |
| A14 | 0.18 | 300 | 6 | 900 | 0.5 | 10 | 0.2 | −0.2 |
| A9 | 0.18 | 300 | 6 | 900 | 0.5 | 3 | 0.8 | 1.4 |
| A10 | 0.14 | 200 | 7 | 1600 | 0.5 | 6 | 5.2 | 4.5 |
| A11 | 0.10 | 200 | 5 | 1600 | 0.5 | 3 | 5.8 | 5.5 |

EXAMPLE 2

| Coating solution (solution I) for upper magnetic layer | |
| --- | --- |
| Ferromagnetic powder (A) and ferromagnetic powder (B) Both (A) and (B): FeOx (x = 1.45) (length of major axis, crystallite size and amount being given in Tables 2 to 4) Vinyl chloride-vinyl acetate copolymer (sulfo group content: 0.25%) | 100 parts (combined amount) |
| (Ex. 2-13) | 31.8 parts |
| (Ex. 2-14) | 20.9 parts |
| (Ex. 2-15) | 3 parts |
| (other Ex.) | 11.3 parts |
| Polyester polyurethane (sulfo group content: 0.1%) | 5 parts |
| Polyisocyanate (Coronate L) | 6 parts |
| Commercial stearic acid | 1 part |
| Commercial butyl stearate | 1 part |
| α-Alumina (particle size: 0.1 μm) | 10 parts |
| Electrically conductive carbon black (particle size: 70 mμ) | 1 part |
| Methyl ethyl ketone/cyclohexanone = 7/3 solvent | 100 parts |
| Coating solution (solution II) for upper magnetic layer | |
| Ferromagnetic powder (A) and ferromagnetic powder (B) Ferromagnetic powder (A): metallic magnetic powder composition (wt %): Fe:Ni:Al = 92:3:5 Ferromagnetic powder (B): FeOx (x = 1.14) (length of major axis, crystallite size and amount being given in Tables 5 to 7) Vinyl chloride-vinyl acetate copolymer (sulfo group content: 0.25%) | 100 parts (combined amount) |
| (Ex. 2-39) | 31.8 parts |
| (Ex. 2-40) | 20.9 parts |
| (Ex. 2-41) | 3 parts |
| (other Ex.) | 11.3 parts |
| Polyester polyurethane (sulfo group-content: 0.1%) | 5 parts |
| Polyisocyanate (Coronate L) | 6 parts |
| Stearic acid (commercial) | 1 part |
| Butyl stearate (commercial) | 1 part |
| α-Alumina (particle size: 0.1 μm) | 10 parts |
| Electrically conductive carbon (particle size: 70 mμ) | 1 part |
| Methyl ethyl ketone/cyclohexanone = 7/3 solvent | 100 parts |
| Coating solution (solution III) for lower magnetic layer | |
| Co—FeOx (x = 1.45) (length of major axis and crystallite size being given in Tables 2 to 7) | 100 parts |
| Vinyl chloride-vinyl acetate copolymer (sulfo group content: 0.25%) | 11 parts |
| Polyester polyurethane (sulfo group content: 0.1%) | 4 parts |
| Polyisocyanate (Coronate L) | 6 parts |
| Stearic acid (commercial) | 1 part |
| Butyl stearate (commercial) | 1 part |
| Electrically conductive carbon (particle size: 20 mμ) | 5 parts |
| Methyl ethyl ketone/cyclohexanone = 7/3 solvent | 100 parts |

A single layer coating and a multi-layer coating were carried out by using the coating solutions prepared above. In Comparative Examples 2–17 and 2–18, a single layer tape was prepared by using the coating solution I. In Comparative Example 2–19, a single layer tape was prepared by using the solution III. In Comparative Example 2–36, a single layer tape was prepared by using the solution II. The layer thickness was 4 μm. Samples were prepared by using solutions I or II for the upper magnetic layer, and solution III for the lower magnetic layer, in such an amount as to give the upper magnetic layer 0.5 μm and the lower magnetic layer 3.5 μm. PET of 14 μm in thickness was used as the support.

The characteristics of the resulting samples were evaluated in the following manner. The results are shown in Tables 2 to 7.

Y-S

Video signals of 50% white were recorded by using reference image transcription current, and the mean value of the envelope of the reproduced output was measured by means of an oscilloscope. Y-S value was calculated from formula (I).

C-S

Video signals of color signals were recorded by using reference image transcription current, and C-S was calculated in the same manner as described above.

$$\text{Sensitivity of reproduced output } (dB) = 20 \log_{10} (V/V_0) \quad (I)$$

wherein V: mean value, $V_0$: the mean value of Comparative Example 2–18)

Y-S/N

A noise meter 925R manufactured by Shibasoku Co., Ltd. was used, and a difference in S/N was determined. The tape of Comparative Example 2–18 was referred to as the standard tape. Noise level was measured by using a high-pass filter (10 kHz) and a low-pass filter (4.2 MHz). VTR used was NV-8200 manufactured by Matsushita Electric Industrial Co., Ltd.

C-S/N

Measurements were made by using the above described noise meter 925R, a high-pass filter (10 kHz) and a low-pass filter (500 kHz). VTR used was NV-8200 manufactured by Matsushita Electric Industrial Co., Ltd. The tape of Comparative Example 2–18 was referred to as the standard (0 dB).

TABLE 2

| Sample No. | Upper magnetic layer | | | | | | Lower magnetic layer | | Electromagnetic characteristics | | | |
|---|---|---|---|---|---|---|---|---|---|---|---|---|
| | ferromagnetic powder (A) | | ferromagnetic powder (B) | | (A):(B) | con- | ferromagnetic powder | | | | | |
| | length of major axis (μ) | crystal- lite size (Å) | length of major axis (μ) | crystal- lite size (Å) | ratio by weight | tent (%) | length of major axis | crystal- lite size | Y-S (dB) | Y-S/N (dB) | C-S (dB) | C-S/N (dB) |
| Comp. Ex. 2-1 | 0.04 | 200 | 0.15 | 300 | 70:30 | 75 | 0.2 | 350 | +1.0 | +1.0 | +1.5 | +1.5 |
| Ex. 2-1 | 0.05 | 200 | 0.15 | 300 | 70:30 | 75 | 0.2 | 350 | +2.8 | +2.5 | +2.8 | +2.5 |
| Ex. 2-2 | 0.1 | 200 | 0.15 | 300 | 70:30 | 75 | 0.2 | 350 | +3.0 | +3.0 | +3.0 | +3.0 |
| Ex. 2-3 | 0.15 | 200 | 0.15 | 300 | 70:30 | 75 | 0.2 | 350 | +3.2 | +3.5 | +3.2 | +3.2 |
| Comp. Ex. 2-2 | 0.17 | 200 | 0.15 | 300 | 70:30 | 75 | 0.2 | 350 | +1.5 | +1.0 | +1.5 | +1.5 |
| Comp. Ex. 2-3 | 0.1 | 90 | 0.15 | 300 | 70:30 | 75 | 0.2 | 350 | +1.0 | +1.0 | +1.5 | +1.5 |
| Ex. 2-4 | 0.1 | 100 | 0.15 | 300 | 70:30 | 75 | 0.2 | 350 | +3.0 | +3.0 | +2.8 | +2.8 |
| Ex. 2-5 | 0.1 | 200 | 0.15 | 300 | 70:30 | 75 | 0.2 | 350 | +3.5 | +3.5 | +3.5 | +3.5 |
| Ex. 2-6 | 0.1 | 300 | 0.15 | 300 | 70:30 | 75 | 0.2 | 350 | +2.8 | +2.5 | +2.8 | +2.5 |
| Comp. Ex. 2-4 | 0.1 | 320 | 0.15 | 300 | 70:30 | 75 | 0.2 | 350 | +1.5 | +1.0 | +1.5 | +1.5 |
| Comp. Ex. 2-5 | 0.1 | 200 | 0.25 | 300 | 70:30 | 75 | 0.2 | 350 | +1.5 | +1.5 | +1.5 | +1.5 |
| Comp. Ex. 2-6 | 0.1 | 200 | 0.1 | 300 | 70:30 | 75 | 0.2 | 350 | +1.8 | +1.8 | +1.8 | +1.5 |
| Ex. 2-7 | 0.1 | 200 | 0.12 | 300 | 70:30 | 75 | 0.2 | 350 | +2.5 | +2.5 | +2.5 | +2.5 |
| Ex. 2-8 | 0.1 | 200 | 0.17 | 300 | 70:30 | 75 | 0.2 | 350 | +2.8 | +3.2 | +2.8 | +2.8 |
| Ex. 2-9 | 0.1 | 200 | 0.2 | 300 | 70:30 | 75 | 0.2 | 350 | +2.5 | +3.0 | +3.0 | +3.0 |

TABLE 3

| Sample No. | Upper magnetic layer | | | | | | Lower magnetic layer | | Electromagnetic characteristics | | | |
|---|---|---|---|---|---|---|---|---|---|---|---|---|
| | ferromagnetic powder (A) | | ferromagnetic powder (B) | | (A):(B) | con- | ferromagnetic powder | | | | | |
| | length of major axis (μ) | crystal- lite size (Å) | length of major axis (μ) | crystal- lite size (Å) | ratio by weight | tent (%) | length of major axis | crystal- lite size | Y-S (dB) | Y-S/N (dB) | C-S (dB) | C-S/N (dB) |
| Comp. Ex. 2-7 | 0.1 | 200 | 0.22 | 300 | 70:30 | 75 | 0.2 | 350 | +1.5 | +1.0 | +1.5 | +2.0 |
| Comp. Ex. 2-8 | 0.1 | 200 | 0.15 | 140 | 70:30 | 75 | 0.2 | 350 | +1.5 | +1.5 | +1.5 | +1.5 |
| Comp. Ex. 2-9 | 0.1 | 200 | 0.15 | 200 | 70:30 | 75 | 0.2 | 350 | +1.8 | +1.8 | +1.8* | +1.5 |
| Ex. 2-10 | 0.1 | 200 | 0.15 | 220 | 70:30 | 75 | 0.2 | 350 | +2.5 | +3.2 | +2.5 | +2.5 |
| Ex. 2-11 | 0.1 | 200 | 0.15 | 300 | 70:30 | 75 | 0.2 | 350 | +3.5 | +3.5 | +3.5 | +3.5 |
| Ex. 2-12 | 0.1 | 200 | 0.15 | 400 | 70:30 | 75 | 0.2 | 350 | +3.2 | +3.2 | +3.2 | +3.2 |
| Comp. Ex. 2-10 | 0.1 | 200 | 0.15 | 420 | 70:30 | 75 | 0.2 | 350 | +1.5 | +1.0 | +1.5 | +2.0 |
| Ex. 2-13 | 0.1 | 200 | 0.15 | 300 | 70:30 | 65 | 0.2 | 350 | +2.3 | +2.3 | +2.3 | +2.3 |
| Ex. 2-14 | 0.1 | 200 | 0.15 | 300 | 70:30 | 70 | 0.2 | 350 | +2.7 | +2.7 | +2.7 | +2.7 |
| Ex. 2-15 | 0.1 | 200 | 0.15 | 300 | 70:30 | 80 | 0.2 | 350 | +3.5 | +3.5 | +3.5 | +3.5 |
| Comp. Ex. 2-11 | 0.1 | 200 | 0.15 | 300 | 70:30 | 70 | 0.13 | 350 | +2.0 | +2.0 | +1.0 | +1.0 |
| Ex. 2-16 | 0.1 | 200 | 0.15 | 300 | 70:30 | 70 | 0.15 | 350 | +3.3 | +3.3 | +3.3 | +3.8 |
| Ex. 2-17 | 0.1 | 200 | 0.15 | 300 | 70:30 | 70 | 0.2 | 350 | +3.0 | +3.0 | +3.0 | +3.0 |
| Ex. 2-18 | 0.1 | 200 | 0.15 | 300 | 70:30 | 70 | 0.25 | 350 | +2.5 | +2.5 | +2.5 | +2.0 |
| Comp. Ex. 2-12 | 0.1 | 200 | 0.15 | 300 | 70:30 | 70 | 0.28 | 350 | +2.0 | +2.0 | +1.0 | +1.0 |

TABLE 4

| Sample No. | Upper magnetic layer | | | | | | Lower magnetic layer | | Electromagnetic characteristics | | | |
|---|---|---|---|---|---|---|---|---|---|---|---|---|
| | ferromagnetic powder (A) | | ferromagnetic powder (B) | | (A):(B) | con- | ferromagnetic powder | | | | | |
| | length of major axis (μ) | crystal- lite size (Å) | length of major axis (μ) | crystal- lite size (Å) | ratio by weight | tent (%) | length of major axis | crystal- lite size | Y-S (dB) | Y-S/N (dB) | C-S (dB) | C-S/N (dB) |
| Comp. Ex. 2-13 | 0.1 | 200 | 0.15 | 300 | 70:30 | 70 | 0.2 | 280 | +2.0 | +2.0 | +1.0 | +1.0 |
| Ex. 2-19 | 0.1 | 200 | 0.15 | 140 | 90:30 | 70 | 0.2 | 300 | +3.3 | +3.3 | +3.3 | +3.8 |
| Ex. 2-20 | 0.1 | 200 | 0.15 | 200 | 70:30 | 70 | 0.2 | 350 | +3.0 | +3.0 | +3.0 | +3.0 |
| Ex. 2-21 | 0.1 | 200 | 0.15 | 220 | 70:30 | 70 | 0.2 | 450 | +2.5 | +2.5 | +2.5 | +2.0 |

TABLE 4-continued

| | Upper magnetic layer | | | | | | Lower magnetic layer | | Electromagnetic characteristics | | | |
|---|---|---|---|---|---|---|---|---|---|---|---|---|
| | ferromagnetic powder (A) | | ferromagnetic powder (B) | | | | ferromagnetic powder | | | | | |
| Sample No. | length of major axis (μ) | crystal-lite size (Å) | length of major axis (μ) | crystal-lite size (Å) | (A):(B) ratio by weight | con-tent (%) | length of major axis | crystal-lite size | Y-S (dB) | Y-S/N (dB) | C-S (dB) | C-S/N (dB) |
| Comp. Ex. 2-14 | 0.1 | 200 | 0.15 | 300 | 70:30 | 70 | 0.2 | 480 | +2.0 | +2.0 | +1.0 | +1.0 |
| Comp. Ex. 2-15 | 0.1 | 200 | 0.15 | 400 | 5:95 | 70 | 0.2 | 350 | +1.5 | +1.0 | +1.5 | +1.5 |
| Ex. 2-22 | 0.1 | 200 | 0.15 | 420 | 10:90 | 70 | 0.2 | 350 | +2.3 | +1.8 | +2.3 | +2.3 |
| Ex. 2-23 | 0.1 | 200 | 0.15 | 300 | 30:70 | 70 | 0.2 | 350 | +2.5 | +2.0 | +2.5 | +2.5 |
| Ex. 2-24 | 0.1 | 200 | 0.15 | 300 | 50:50 | 70 | 0.2 | 350 | +2.8 | +2.5 | +2.8 | +2.8 |
| Ex. 2-25 | 0.1 | 200 | 0.15 | 300 | 70:30 | 70 | 0.2 | 350 | +3.0 | +3.0 | +3.0 | +3.0 |
| Ex. 2-26 | 0.1 | 200 | 0.15 | 300 | 90:10 | 70 | 0.13 | 350 | +3.0 | +3.5 | +3.0 | +3.5 |
| Comp. Ex. 2-16 | 0.1 | 200 | 0.15 | 300 | 95:5 | 70 | 0.15 | 350 | +1.5 | +2.0 | +1.5 | +1.5 |
| Comp. Ex. 2-17 | 0.1 | 200 | — | — | | 75 | — | — | 0.0 | 0.0 | 0.0 | 0.0 |
| Comp. Ex. 2-18 | — | — | 0.15 | 300 | | 75 | — | — | −0.5 | −1.0 | −0.5 | −1.0 |
| Comp. Ex. 2-19 | — | — | — | — | | | 0.2 | 350 | −1.0 | −1.5 | −1.0 | −1.5 |

TABLE 5

| | Upper magnetic layer | | | | | | Lower magnetic layer | | Electromagnetic characteristics | | | |
|---|---|---|---|---|---|---|---|---|---|---|---|---|
| | ferromagnetic powder (A) | | ferromagnetic powder (B) | | | | ferromagnetic powder | | | | | |
| Sample No. | length of major axis (μ) | crystal-lite size (Å) | length of major axis (μ) | crystal-lite size (Å) | (A):(B) ratio by weight | con-tent (%) | length of major axis | crystal-lite size | Y-S (dB) | Y-S/N (dB) | C-S (dB) | C-S/N (dB) |
| Comp. Ex. 2-20 | 0.04 | 200 | 0.15 | 300 | 70:30 | 75 | 0.2 | 350 | +2.0 | +2.0 | +2.5 | +2.5 |
| Ex. 2-27 | 0.05 | 200 | 0.15 | 300 | 70:30 | 75 | 0.2 | 350 | +4.2 | +4.5 | +4.2 | +4.2 |
| Ex. 2-28 | 0.1 | 200 | 0.15 | 300 | 70:30 | 75 | 0.2 | 350 | +4.0 | +4.0 | +4.0 | +4.0 |
| Ex. 2-29 | 0.15 | 200 | 0.15 | 300 | 70:30 | 75 | 0.2 | 350 | +3.8 | +3.5 | +3.8 | +3.5 |
| Comp. Ex. 2-21 | 0.17 | 200 | 0.15 | 300 | 70:30 | 75 | 0.2 | 350 | +2.5 | +2.0 | +2.5 | +2.5 |
| Comp. Ex. 2-22 | 0.1 | 90 | 0.15 | 300 | 70:30 | 75 | 0.2 | 350 | +2.0 | +2.0 | +2.5 | +2.5 |
| Ex. 2-30 | 0.1 | 100 | 0.15 | 300 | 70:30 | 75 | 0.2 | 350 | +4.2 | +4.5 | +4.2 | +4.2 |
| Ex. 2-31 | 0.1 | 200 | 0.15 | 300 | 70:30 | 75 | 0.2 | 350 | +4.0 | +4.0 | +4.0 | +4.0 |
| Ex. 2-32 | 0.1 | 300 | 0.15 | 300 | 70:30 | 75 | 0.2 | 350 | +3.8 | +3.5 | +3.8 | +3.5 |
| Comp. Ex. 2-23 | 0.1 | 320 | 0.15 | 300 | 70:30 | 75 | 0.2 | 350 | +2.5 | +2.0 | +2.5 | +2.5 |
| Camp. Ex. 2-24 | 0.1 | 200 | 0.25 | 300 | 70:30 | 75 | 0.2 | 350 | +2.5 | +2.5 | +2.5 | +2.5 |
| Comp. Ex. 2-25 | 0.1 | 200 | 0.1 | 300 | 70:30 | 75 | 0.2 | 350 | +2.8 | +2.8 | +2.8 | +2.5 |
| Ex. 2-33 | 0.1 | 200 | 0.12 | 300 | 70:30 | 75 | 0.2 | 350 | +3.5 | +4.2 | +3.5 | +3.5 |
| Ex. 2-34 | 0.1 | 200 | 0.17 | 300 | 70:30 | 75 | 0.2 | 350 | +3.8 | +3.8 | +3.8 | +3.8 |
| Ex. 2-35 | 0.1 | 200 | 0.2 | 300 | 70:30 | 75 | 0.2 | 350 | +3.5 | +3.5 | +3.5 | +3.5 |

TABLE 6

| | Upper magnetic layer | | | | | | Lower magnetic layer | | Electromagnetic characteristics | | | |
|---|---|---|---|---|---|---|---|---|---|---|---|---|
| | ferromagnetic powder (A) | | ferromagnetic powder (B) | | | | ferromagnetic powder | | | | | |
| Sample No. | length of major axis (μ) | crystal-lite size (Å) | length of major axis (μ) | crystal-lite size (Å) | (A):(B) ratio by weight | con-tent (%) | length of major axis | crystal-lite size | Y-S (dB) | Y-S/N (dB) | C-S (dB) | C-S/N (dB) |
| Comp. Ex. 2-26 | 0.1 | 200 | 0.22 | 280 | 70:30 | 75 | 0.2 | 350 | +2.5 | +2.0 | +2.5 | +3.0 |
| Comp. Ex. 2-27 | 0.1 | 200 | 0.15 | 140 | 70:30 | 75 | 0.2 | 350 | +2.5 | +2.5 | +2.5 | +2.5 |
| Comp. Ex. 2-28 | 0.1 | 200 | 0.15 | 200 | 70:30 | 75 | 0.2 | 350 | +2.8 | +2.8 | +2.8 | +2.5 |
| Ex. 2-36 | 0.1 | 200 | 0.15 | 220 | 70:30 | 75 | 0.2 | 350 | +3.5 | +4.2 | +3.5 | +3.5 |
| Ex. 2-37 | 0.1 | 200 | 0.15 | 300 | 70:30 | 75 | 0.2 | 350 | +3.8 | +3.8 | +3.8 | +3.8 |
| Ex. 2-38 | 0.1 | 200 | 0.15 | 400 | 70:30 | 75 | 0.2 | 350 | +3.5 | +3.5 | +3.5 | +3.5 |
| Comp. Ex. 2-29 | 0.1 | 200 | 0.15 | 420 | 70:30 | 75 | 0.2 | 350 | +2.5 | +2.0 | +2.5 | +3.0 |
| Ex. 2-39 | 0.1 | 200 | 0.15 | 280 | 70:30 | 65 | 0.2 | 350 | +3.3 | +3.3 | +3.3 | +3.3 |

TABLE 6-continued

| | Upper magnetic layer | | | | | | | Lower magnetic layer | | Electromagnetic characteristics | | | |
| | ferromagnetic powder (A) | | ferromagnetic powder (B) | | | | ferromagnetic powder | | | | | |
| Sample No. | length of major axis (μ) | crystal- lite size (Å) | length of major axis (μ) | crystal- lite size (Å) | (A):(B) ratio by weight | con- tent (%) | length of major axis | crystal- lite size | Y-S (dB) | Y-S/N (dB) | C-S (dB) | C-S/N (dB) |
|---|---|---|---|---|---|---|---|---|---|---|---|---|
| Ex. 2-40 | 0.1 | 200 | 0.15 | 280 | 70:30 | 70 | 0.2 | 350 | +3.7 | +3.7 | +3.7 | +3.7 |
| Ex. 2-41 | 0.1 | 200 | 0.15 | 280 | 70:30 | 80 | 0.2 | 350 | +4.5 | +4.5 | +4.5 | +4.5 |
| Camp. Ex. 2-30 | 0.1 | 200 | 0.15 | 280 | 70:30 | 70 | 0.13 | 350 | +3.0 | +3.0 | +2.0 | +2.0 |
| Ex. 2-42 | 0.1 | 200 | 0.15 | 280 | 70:30 | 70 | 0.15 | 350 | +4.3 | +4.3 | +4.3 | +4.8 |
| Ex. 2-43 | 0.1 | 200 | 0.15 | 280 | 70:30 | 70 | 0.2 | 350 | +4.0 | +4.0 | +4.0 | +4.0 |
| Ex. 2-44 | 0.1 | 200 | 0.15 | 280 | 70:30 | 70 | 0.25 | 350 | +3.5 | +3.5 | +3.5 | +3.0 |
| Comp. Ex. 2-31 | 0.1 | 200 | 0.15 | 280 | 70:30 | 70 | 0.28 | 350 | +3.0 | +3.0 | +2.0 | +2.0 |

TABLE 7

| | Upper magnetic layer | | | | | | | Lower magnetic layer | | Electromagnetic characteristics | | | |
| | ferromagnetic powder (A) | | ferromagnetic powder (B) | | | | ferromagnetic powder | | | | | |
| Sample No. | length of major axis (μ) | crystal- lite size (Å) | length of major axis (μ) | crystal- lite size (Å) | (A):(B) ratio by weight | con- tent (%) | length of major axis | crystal- lite size | Y-S (dB) | Y-S/N (dB) | C-S (dB) | C-S/N (dB) |
|---|---|---|---|---|---|---|---|---|---|---|---|---|
| Comp. Ex. 2-32 | 0.1 | 200 | 0.15 | 300 | 70:30 | 70 | 0.2 | 280 | +3.0 | +3.0 | +2.0 | +2.0 |
| Ex. 2-45 | 0.1 | 200 | 0.15 | 140 | 70:30 | 70 | 0.2 | 300 | +4.3 | +4.3 | +4.3 | +4.8 |
| Ex. 2-46 | 0.1 | 200 | 0.15 | 200 | 70:30 | 70 | 0.2 | 350 | +4.0 | +4.0 | +4.0 | +4.0 |
| Ex. 2-47 | 0.1 | 200 | 0.15 | 220 | 70:30 | 70 | 0.2 | 450 | +3.5 | +3.5 | +3.5 | +3.0 |
| Comp. Ex. 2-33 | 0.1 | 200 | 0.15 | 300 | 70:30 | 70 | 0.2 | 480 | +3.0 | +3.0 | +2.0 | +2.0 |
| Comp. Ex. 2-34 | 0.1 | 200 | 0.15 | 400 | 5:95 | 70 | 0.2 | 350 | +2.5 | +2.0 | +2.5 | +2.5 |
| Ex. 2-48 | 0.1 | 200 | 0.15 | 420 | 10:90 | 70 | 0.2 | 350 | +3.3 | +2.8 | +3.3 | +3.3 |
| Ex. 2-49 | 0.1 | 200 | 0.15 | 300 | 30:70 | 70 | 0.2 | 350 | +3.5 | +3.0 | +3.5 | +3.5 |
| Ex. 2- 50 | 0.1 | 200 | 0.15 | 300 | 50:50 | 70 | 0.2 | 350 | +3.8 | +3.5 | +3.8 | +3.8 |
| Ex. 2- 51 | 0.1 | 200 | 0.15 | 300 | 70:30 | 70 | 0.2 | 350 | +4.0 | +4.0 | +4.0 | +4.0 |
| Ex. 2-52 | 0.1 | 200 | 0.15 | 300 | 90:10 | 70 | 0.13 | 350 | +3.5 | +3.5 | +3.5 | +3.5 |
| Comp. Ex. 2-35 | 0.1 | 200 | 0.15 | 300 | 95:5 | 70 | 0.15 | 350 | +2.5 | +3.0 | +2.5 | +2.5 |
| Comp. Ex. 2-36 | 0.1 | 200 | — | — | — | 75 | — | — | +1.0 | +1.0 | +1.0 | +1.0 |

It is apparent from Comparative Examples 2–1 to 2–5 and 2–20 to 2–24 and Examples 2–1 to 2–6 and 2–27 to 2–32 that when the particle size of ferromagnetic powder (A) is too small, dispersibility is lowered, and; as a result, electromagnetic characteristics are lowered. Moreover, when the particle size is too large, the loading degree is lowered, noise is increased and electromagnetic characteristics (particularly Y-S, Y-S/N) are deteriorated.

It is clear from Comparative Examples 2–6 to 2–10 and 2–25 to 2–29 and Examples 2–7 to 2–12 and 2–33 to 2–38 that when the particle size of ferromagnetic powder (B) is too small, dispersibility is lowered and as a result, electromagnetic characteristics are lowered. When the particle size of ferromagnetic powder (B) is substantially equal to that of ferromagnetic powder (A), there is no merit with regard to electromagnetic characteristics. When the particle size of ferromagnetic powder (B) is too large, the loading degree is lowered, noise is increased and electromagnetic characteristics (particularly Y-S, Y-S/N) are greatly deteriorated. It is also clear from Comparative Examples 2–11 to 2–14, 2–30 to 2–33, and Examples 2–16 to 2–21, and 2–42 to 2–47, that when the particle size of ferromagnetic powder contained in the lower magnetic layer is too small, dispersibility is lowered. Hence, surface profiles are deteriorated (there is an effect on short wavelength component), the squareness ratio of the lower layer is lowered (there is an effect on long wavelength component) and electromagnetic characteristics are lowered. Moreover, when the particle size is too large, the loading degree of the lower layer is decreased, noise in long wavelength component is increased, and electromagnetic characteristics are lowered.

Further, it is clear from Comparative Examples 2–15, 2–16, 2–34 and 2–35, and Examples 2–22 to 2–26 and 2–48 to 2–52, that when the ratio of ferromagnetic powder (A) to ferromagnetic powder (B) is outside the range of form 10/90 to 90/10 by weight, the effect of improving the loading degree and reducing noise by using finer powder cannot be simultaneously obtained, and there is no merit with regard to electromagnetic characteristics According to the present invention, there is provided a magnetic recording medium comprising a non-magnetic support having thereon a plurality of magnetic layers composed of a lower magnetic layer comprising ferromagnetic powder and a binder in which an upper magnetic layer is provided on said lower magnetic layer; wherein ferromagnetic powder contained in the upper magnetic layer has a length of major axis of not longer than 0.30 μm and a crystallite size of not larger than 400 Å, the upper magnetic layer has a dry thickness of not more than 1.2 μm and the center line average surface roughness (Ra) of the surface of the upper magnetic layer is not more than 0.015 μm, whereby electromagnetic characteristics can be improved. In addition, when ferromagnetic powder having a ratio in which the length of the major axis to the crystallite size is not lower than 3, but not higher than 7 is used, or when two kinds of ferromagnetic powders having different major axis lengths and crystallite sizes are used, the loading degree of ferromagnetic powder used in the upper magnetic layer is improved and electromagnetic characteristics such as Y-S, C-S, Y-S/N and C-S/N are remarkably improved.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a plurality of magnetic layers each comprising a ferromagnetic powder and a binder, and said plurality of magnetic layers is composed of a lower magnetic layer and an upper magnetic layer provided on said lower magnetic layer, wherein the ferromagnetic powder contained in the upper magnetic layer has a length of major axis not longer than 0.30 μm and a crystallite size not larger than 400 Å, the upper magnetic layer has a dry thickness of not more than 1.20 μm, and the surface of the upper magnetic layer has a center-line average surface roughness (Ra) of 0.006 μm or less, and wherein:

(a) the ratio of the length of the major axis to the crystallite size of the ferromagnetic powder contained in the upper magnetic layer is from 3:1 to 7:1; and (b) a dry thickness of the upper magnetic layer is not more than 30 times the crystallite size of ferromagnetic powder contained in the upper magnetic layer.

2. A magnetic recording medium as in claim 1, wherein the ferromagnetic powder contained in the upper magnetic layer comprises (A) a fine-grained ferromagnetic powder having a length of major axis of 0.05 to to 0.15 μm and a crystallite size of 100 to 300 Å, and (B) a coarse-grained ferromagnetic powder having a length of major axis of 0.10 to 0.20 μm and a crystallite size of 150 to 400 Å in a ratio of the ferromagnetic powder (A) to the ferromagnetic powder (B) of from 10/90 to 90/10 by weight, both the length of the major axis and the crystallite size of the ferromagnetic powder (A) are smaller than those of the ferromagnetic powder (B), the lower magnetic layer contains a ferromagnetic powder having a length of major axis of 0.15 to 0.25 μm and a crystallite size of 300 to 450 Å, and both the length of the major axis and the crystallite size of the ferromagnetic powder contained in the lower magnetic layer are larger than those of the ferromagnetic powder (B) contained in the upper magnetic layer.

3. A magnetic recording medium as in claim 1, wherein the ferromagnetic powder content in the upper magnetic layer is at least 70% by weight.

4. A magnetic recording medium as in claim 1, wherein the ferromagnetic powder contained in the upper magnetic layer has a length of major axis not longer than 0.2 μm and a crystallite size of 150 to 350 Å.

5. A magnetic recording medium as in claim 1, wherein the ratio of the length of the major axis to the crystallite size of the ferromagnetic powder contained in the upper magnetic layer is from 4:1 to 6:1.

6. A magnetic recording medium as in claim 2, wherein the ferromagnetic powder content in the upper magnetic layer is at least 70% by weight.

7. A magnetic recording medium as in claim 2, wherein the ferromagnetic powder (A) has a length of major axis of 0.08 to 0.15 μm and a crystallite size of 150 to 290 Å and the ferromagnetic powder (B) has a length of major axis of 0.15 to 0.20 μm and a crystallite size of 290 to 400 Å.

8. A magnetic recording medium as in claim 2, wherein the ratio of the ferromagnetic powder (A) to the ferromagnetic powder (B) is from 70/30 to 90/10.

* * * * *